Oct. 31, 1950 G. E. KRIDER 2,527,939
TRACTION DEVICE

Filed March 29, 1948 2 Sheets-Sheet 1

INVENTOR.
GEORGE E. KRIDER
BY
*J. Wesley Everett*

Oct. 31, 1950 G. E. KRIDER 2,527,939
TRACTION DEVICE
Filed March 29, 1948 2 Sheets-Sheet 2

INVENTOR.
GEORGE E. KRIDER
BY
J Wesley Everett

Patented Oct. 31, 1950

2,527,939

UNITED STATES PATENT OFFICE 2,527,939

TRACTION DEVICE

George E. Krider, Duncansville, Pa.

Application March 29, 1948, Serial No. 17,633

4 Claims. (Cl. 152—213)

The improved anti-skid traction device is primarily adapted for use with pneumatic tires on wheeled vehicles.

The task of applying these devices has always been very difficult, even by those of experience, and is becoming more so because of the present body designs in which the body or the fenders of the vehicle extend more and more over the wheels. It is with this thought in mind that the present device has been developed.

The primary object of the invention being to provide such a device that will be more easily applied to the tire of the wheel than any of those now known.

Another object is to provide a device of this character which will be practical in its application and economical to manufacture.

With these and other objects in view which will be more apparent as the nature of the apparatus is better understood, and consists in the novel construction, combination and arrangement of parts shown in the accompanying drawings and the detail description forming a part of this specification and in which.

In all the above views like characters of reference are employed to designate like parts throughout.

The present embodiment of the invention comprises in its general organization a plurality of flat arm members 2, 2' and 2" extending outwardly and over the tire of the vehicle for supporting and positioning a plurality of cross and side chain members, together with means adjacent and to one side of the center of the wheel for retaining the arm members over the tires as the same are rotated.

Figure 1:
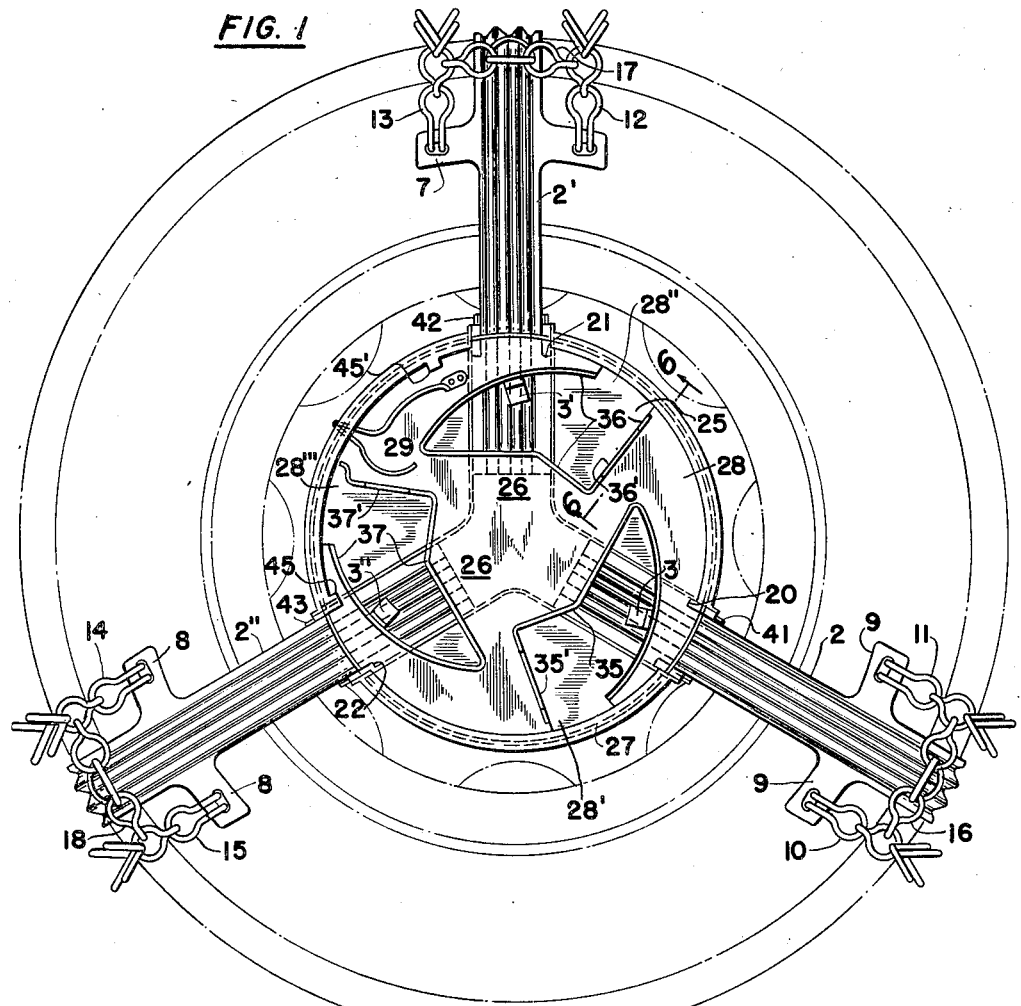
Figure 1 is a view of the improved device in front elevation.
Figure 2:
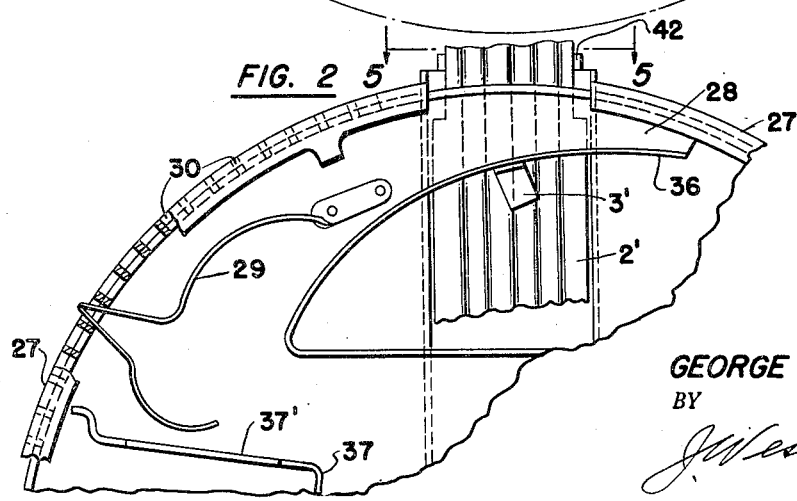
Figure 2 is an enlarged fragmentary view of a portion of the device, showing in particular the locking member.
Figure 3:
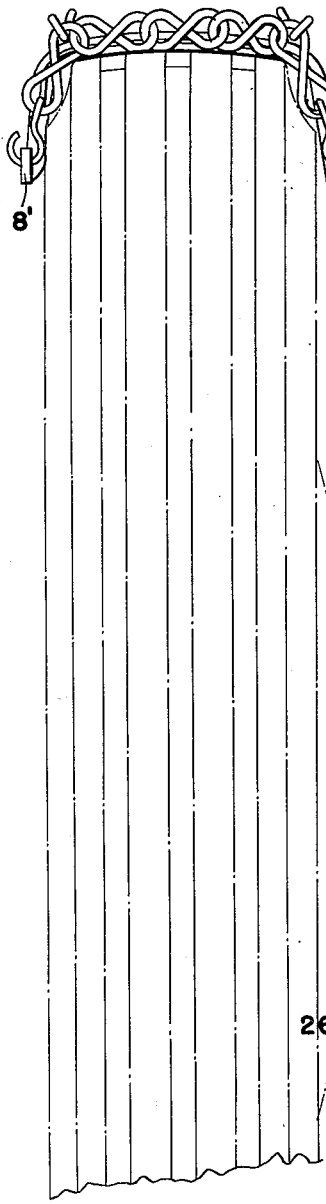
Figure 3 is a view in side elevation similar to that shown in Figure 1.
Figure 4:
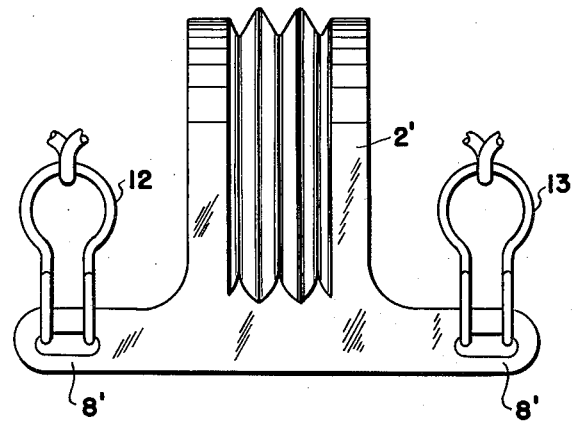
Figure 4 is an enlarged view of the back portion of one of the U-shaped end members.
Figure 5:
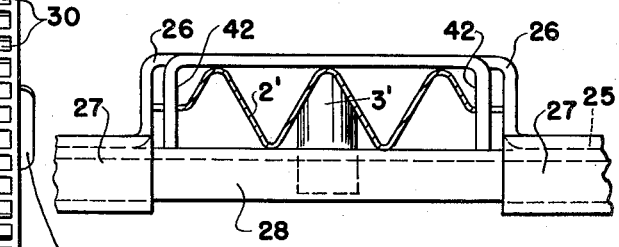
Figure 5 is an enlarged fragmentary sectional view taken along the line 5—5 of Figure 2.
Figure 6:
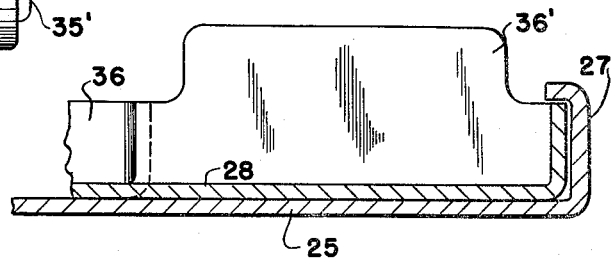
Figure 6 is an enlarged fragmentary sectional view taken along the line 6—6 of Figure 1.

The arm members are preferably corrugated and of U-shaped form adjacent their outer ends for the purpose of extending over the tire as shown best in Figure 3, the curvature of the outer U-shaped end portion being such as to conform to the tire tread. Extending laterally from each side of the outer end of the arms are members 7, 8, 9 and 8' (and 7' and 9', not shown) for supporting cross and side chains 10, 11, 12, 13, 14, 15, 16, 17 and 18. The cross chains are for the purpose of giving traction to the rotating wheel, while the side chains 16 to 18, extending between the cross chains on the opposite side of the tire (not shown), aid in preventing the wheel from slipping laterally. The inner ends of the arms are slightly wider than the main portion of the arm forming shoulders 20, 21 and 22 with the remaining, or outer, portion of the arm for holding the arms in initial assembled position.

The arm retaining means comprises a circular plate, or disk, 25 having a recessed channel 26 for receiving the inner ends of the arm members. The outer circumferential edge 27 of the plate 25 is turned to form a groove to receive a second plate member 28. This second plate, or disk, member 28 is mounted adjacent the plate 25 and is rotatable relative thereto and about a common axis. The outer edge of the plate 28 being slidably receivable within the groove formed about the outer edge 27 of the plate 25. The two plates are held in adjusted position by the spring member 29 which is receivable within the small aperture 30 formed within the outer edge 27 of the plate 25. The plate 28 is cut away as outlined by the outwardly turned edges 35, 36 and 37 to form a rim-like structure and cam member. A portion of the rims 35', 36' and 37', adjacent the outer circumference of the plate, is slightly raised for the purpose of forming lugs by which the plate 28 may be more easily rotated. The portion of the articulated edges 35, 36, and 37 adjacent the outer circumference of the plate is formed with a slightly smaller curvature than the outer edge of the circular plate 25. The plate 28 is cut away at the points 28', 28" and 28''' which may be rotated to register with the channels 26 for admitting the arms 2, 2' and 2" at the initial stage of applying the traction device to the tire.

Located about the over turned edge 27 are stops 45 and 45' for limiting the rotation of the plate 28 upon the plate 25.

The arms 2, 2' and 2" are provided with lugs 3, 3' and 3" for engaging the rims 35, 36 and 37 for moving the arms inwardly as the plate 28 is rotated in a clockwise direction. While the arms may be limited in their outward movement by the lug members 3, 3' and 3" and by the rim members 35, 36 and 37, they may move inwardly the distance of the cut out portion of the plate 28 as previously described.

The arm members are held within the channels 26 by the outer edge of the plate 28 when it is rotated clockwise until the openings 28', 28" and 28''' no longer register with the channels.

Secured to the plate 25 and across the outer end of the channels 26 are brackets 41, 42 and 43 which are of such breadth as to receive the upper or central portions of the arms, and are adapted to contact the shoulders 20, 21 and 22 for limiting the outward adjustment of the arms, and to also position the lugs 3, 3' and 3" to receive the articulate cams 35, 36, and 37 when the plate 28 is rotated.

In attaching the device to a tire, the first operation is to rotate the plate 28 until the opening 28', 28" and 28''' register with the channels 26, then a single arm assembly is placed over the top of the tire and the inner end is inserted within the channel. The arm holding means, or plates 25 and 28, is supported by the shoulders 21 engaging the bracket 42. The other arm assemblies are likewise inserted into the channels 26 in substantially the same manner, being positioned in their outward location by the shoulders 20 and 22 and the brackets 41 and 43. At this point the spring 29 is depressed to disengage it from the openings 30 of the rim 27 and rotated clockwise. The rims 35, 36 and 37 will engage the lugs 3, 3' and 3" which are in turn secured to the inner ends of the arms, moving all of the arms inwardly simultaneously until the outer U-shaped ends of the arms are firmly seated upon the tread of the tire at which time the spring 29 is released, whereby it will again contact one of the apertures 30 of the rim 27 and retain the plate in position relative to the plate 25.

To remove the device, the operation is reversed. That is, the plate 28 is rotated anti-clockwise until the openings 28', 28" and 28''' register with the channels 26 when the arm members may be easily and readily removed.

While one form of the invention has been illustrated and described in detail, it is not intended that it be limited to this particular arrangement as various changes in the details of construction may be resorted to without departing from the spirit of the invention, and only in so far as the invention has been particularly pointed out in the accompanying claims is the same to be limited.

I claim:

1. A wheel traction device for pneumatic tires comprising a plurality of elongated rigid arm members, the outer ends of which are of U-shape form and are adapted to extend over the tread and along both sides thereof, one end of each of the said rigid arms being adapted to be received within a centrally located arm holding means, the said arm holding means having a single rotatable member adapted to engage the arm and adjust the said arms inwardly when the said member is rotated, and means for securing the said arms against outward movement by securing the said rotatable members in position.

2. A wheel traction device for pneumatic tires comprising a plurality of elongated rigid arm members the outer ends of which are of U-shape form and are adapted to locate and position a plurality of cross chains over the tread of the tire, one end of each of the said arms being adapted to be received within a centrally located arm holding means, the arm holding means having a rotatable plate member associated therewith, means carried by the said rotatable member for engaging the said rigid arm members for moving the arms inwardly upon the tire tread when the said member is rotated, and means for releasably securing the said rotatable member in position.

3. A wheel traction device for pneumatic tires comprising a plurality of U-shaped rigid arm members the outer ends of which are adapted to fit over the tire tread and the inner end being adapted to be received within an arm holding means, the arm holding means having a rotatable plate member associated therewith, channel means for guiding the said rigid arms in a radial direction, means associated with the said rotatable plate for adjusting the said arms in said channels and means for locking the said plate in position.

4. A wheel traction device for pneumatic tires comprising a plurality of U-shaped arm members the outer ends of which are adapted to fit over the tire tread and the inner end being adapted to be received within an arm holding means, the arm holding means having a rotatable plate and a stationary member having radial channels associated therewith, means associated with the channels for initially positioning the said arms, cam means associated with the rotatable plate member, a lug member carried by the said arms for engaging the said cams for adjusting the arms inwardly to bring the outer U-shaped ends in contact with the tread surface and means for locking the said plate member in position relative to the stationary member, thereby limiting the outward movement of the said arms.

GEORGE E. KRIDER.

REFERENCES CITED

The following references are of record in the file of this patent:

UNITED STATES PATENTS

| Number | Name | Date |
|---|---|---|
| 1,467,927 | Doerres | Sept. 11, 1923 |
| 1,981,291 | Thomas | Nov. 20, 1934 |
| 2,154,047 | Krider | Apr. 11, 1939 |
| 2,423,759 | Edwards | July 8, 1947 |
| 2,456,544 | Varner | Dec. 14, 1948 |